United States Patent
Cuenca et al.

(10) Patent No.: US 11,703,897 B2
(45) Date of Patent: Jul. 18, 2023

(54) LDO OVERSHOOT PROTECTION IN A CASCADED ARCHITECTURE

(71) Applicants: STMicroelectronics S.r.l., Agrate Brianza (IT); STMicroelectronics (Rousset) SAS, Rousset (FR)

(72) Inventors: Michel Cuenca, Septemes les Vallons (FR); Bruno Gailhard, Rognes (FR); Daniele Mangano, San Gregorio di Catania (IT)

(73) Assignees: STMicroelectronics S.r.l., Agrate Brianza (IT); STMicroelectronics (Rousset) SAS, Rousset (FR)

( * ) Notice: Subject to any disclaimer, the term of this patent is extended or adjusted under 35 U.S.C. 154(b) by 97 days.

(21) Appl. No.: 16/810,639

(22) Filed: Mar. 5, 2020

(65) Prior Publication Data
US 2021/0278868 A1 Sep. 9, 2021

(51) Int. Cl.
*G05F 1/56* (2006.01)
(52) U.S. Cl.
CPC ...................................... *G05F 1/56* (2013.01)
(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735; G05F 1/59; G05F 1/563; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/52; G05F 3/10; G05F 3/16; G05F 3/18; G05F 3/185; G05F 3/20; G05F 3/26; G05F 3/30;
(Continued)

(56) References Cited
U.S. PATENT DOCUMENTS

| 6,121,694 A * | 9/2000 | Thereze | H02J 9/061 307/64 |
| 6,229,289 B1 * | 5/2001 | Piovaccari | H02M 3/1588 323/273 |

(Continued)

FOREIGN PATENT DOCUMENTS

| EP | 1919066 A2 * | 5/2008 | ............... G05F 1/56 |

OTHER PUBLICATIONS

Maxim Integrated, "Low-Dropout Linear Regulator," LDO Application Tutorial, www.maximintegrated.com/ldo, Rev 0; Feb. 2018, 10 pages.

(Continued)

*Primary Examiner* — Kevin J Comber
*Assistant Examiner* — Nusrat Quddus
(74) *Attorney, Agent, or Firm* — Slater Matsil, LLP

(57) ABSTRACT

In an embodiment, a method includes: receiving a main supply voltage; generating a first regulated output voltage with a DC-DC converter; providing the main supply voltage to a driver of a control terminal of an output transistor of an LDO; receiving, at an input terminal of the LDO, the first regulated output voltage; generating, at an output terminal of the LDO, a second regulated output voltage from the first regulated output voltage; and when the main supply voltage falls below a predetermined threshold, discharging a capacitor coupled to the input terminal of the LDO by activating a switch coupled to the input terminal of the LDO.

20 Claims, 4 Drawing Sheets

(58) Field of Classification Search
CPC ... G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; H05B 39/048; B23K 11/24; H04B 2215/069

See application file for complete search history.

(56) References Cited

U.S. PATENT DOCUMENTS

| | | | | |
|---|---|---|---|---|
| 7,030,596 B1 * | 4/2006 | Salerno | | H02M 3/158 323/282 |
| 7,064,531 B1 * | 6/2006 | Zinn | | H02M 3/1584 323/283 |
| 7,230,408 B1 * | 6/2007 | Vinn | | H02M 3/158 323/273 |
| 7,612,549 B1 | 11/2009 | Kao et al. | | |
| 7,812,580 B2 * | 10/2010 | Watanabe | | H02M 3/1588 323/268 |
| 8,531,851 B2 * | 9/2013 | Chen | | H03K 17/0822 323/321 |
| 8,723,492 B2 * | 5/2014 | Korzeniowski | | H02M 3/158 323/273 |
| 8,773,095 B2 | 7/2014 | Gakhar et al. | | |
| 8,797,008 B2 | 8/2014 | Devegowda | | |
| 8,988,054 B2 * | 3/2015 | Marty | | H02M 3/158 323/273 |
| 9,431,902 B2 * | 8/2016 | Garrett | | H02M 3/156 |
| 9,531,265 B1 * | 12/2016 | Voigtlander | | H02M 3/156 |
| 9,582,017 B2 * | 2/2017 | Petenyi | | H02H 7/1213 |
| 9,651,966 B2 * | 5/2017 | Cui | | G05F 1/562 |
| 9,653,994 B2 * | 5/2017 | Taguchi | | H02M 3/158 |
| 9,904,306 B2 * | 2/2018 | Yeon | | B60L 53/305 |
| 9,983,605 B2 | 5/2018 | Duong et al. | | |
| 9,983,643 B2 * | 5/2018 | Powell | | G06F 1/26 |
| 9,989,981 B1 | 6/2018 | Du et al. | | |
| 9,998,010 B1 * | 6/2018 | Ibrahim | | H02M 3/07 |
| 10,185,342 B2 * | 1/2019 | Melgar | | H02M 3/158 |
| 10,303,193 B2 * | 5/2019 | Sautto | | G05F 1/565 |
| 10,516,327 B2 * | 12/2019 | Yang | | H02M 7/2176 |
| 10,756,628 B2 * | 8/2020 | Cuenca | | H02M 3/156 |
| 10,855,185 B2 * | 12/2020 | Song | | G05F 1/56 |
| 10,892,683 B2 * | 1/2021 | Nam | | H02M 3/158 |
| 2005/0213354 A1 * | 9/2005 | Pai | | H02M 3/156 363/21.06 |
| 2009/0230934 A1 * | 9/2009 | Hooijschuur | | H02M 3/07 323/351 |
| 2009/0278517 A1 * | 11/2009 | Kleveland | | G05F 1/563 323/272 |
| 2010/0060078 A1 * | 3/2010 | Shaw | | G05F 1/56 307/31 |
| 2011/0156672 A1 * | 6/2011 | Gakhar | | H02H 9/001 323/280 |
| 2012/0038334 A1 * | 2/2012 | Peng | | H02M 3/1588 323/282 |
| 2012/0268094 A1 * | 10/2012 | Scaldaferri | | H02M 3/156 323/284 |
| 2013/0063110 A1 * | 3/2013 | Ivanov | | H02M 3/158 323/280 |
| 2013/0063111 A1 * | 3/2013 | Ivanov | | H02M 3/1588 323/280 |
| 2013/0069613 A1 * | 3/2013 | Nakase | | H02M 3/156 323/284 |
| 2013/0271098 A1 * | 10/2013 | Attianese | | H02M 3/158 323/271 |
| 2013/0293139 A1 * | 11/2013 | Sadwick | | H05B 45/28 315/224 |
| 2013/0320942 A1 * | 12/2013 | Vemula | | G05F 1/573 323/274 |
| 2014/0217999 A1 * | 8/2014 | Wibben | | H02M 3/156 323/282 |
| 2014/0266089 A1 | 9/2014 | Pancholi et al. | | |
| 2015/0022166 A1 * | 1/2015 | Bisson | | G05F 1/575 323/280 |
| 2015/0042300 A1 * | 2/2015 | Peker | | H02M 3/1588 323/274 |
| 2015/0137781 A1 | 5/2015 | Qu et al. | | |
| 2016/0079852 A1 * | 3/2016 | Lai | | H02M 3/158 323/271 |
| 2016/0085284 A1 * | 3/2016 | Sumitomo | | G05F 1/10 713/340 |
| 2016/0187905 A1 * | 6/2016 | Nakamoto | | G05F 1/56 323/280 |
| 2016/0334818 A1 | 11/2016 | Singh et al. | | |
| 2017/0117803 A1 * | 4/2017 | Matsuki | | H02M 1/08 |
| 2018/0375434 A1 * | 12/2018 | Biziitu | | H02M 3/156 |
| 2019/0372464 A1 * | 12/2019 | Petricaroli | | H02M 3/158 |
| 2019/0384339 A1 * | 12/2019 | Pelicia | | G05F 1/00 |
| 2020/0076297 A1 * | 3/2020 | Nag | | H02M 3/156 |
| 2020/0333873 A1 * | 10/2020 | El Sherif | | G06F 1/263 |
| 2021/0124382 A1 * | 4/2021 | Deka | | G05F 1/461 |
| 2021/0271277 A1 * | 9/2021 | Ahmed | | G05F 1/575 |
| 2022/0060180 A1 * | 2/2022 | Munoz Constantine | | H02M 3/157 |

OTHER PUBLICATIONS

Patoux, J., "Ask the Applications Engineer-37, Low-Dropout Regulators," Analog Dialogue 41-05, http://www.analog.com/analogdialogue, May 2007, pp. 1-3.

Texas Instruments, "Understanding Low Dropout (LDO) Regulators," 2006 Texas Instruments Portable Power Design Seminar, Topic 9, TI Literature No. SLUP239A, 9 pages.

* cited by examiner

PRIOR ART

LDO OVERSHOOT PROTECTION IN A CASCADED ARCHITECTURE

TECHNICAL FIELD

The present disclosure relates generally to an electronic system and method, and, in particular embodiments, to a low dropout (LDO) regulator overshoot protection.

BACKGROUND

DC-to-DC converters (also referred to as DC-DC converters) receive a DC input voltage at an input and provide a regulated DC output voltage at an output. Generally, DC-DC converters are of the switched-mode power supply (SMPS) type. Examples of SMPS DC-DC converters are buck converters (which provides a regulated output voltage that is lower than the input voltage), boost converters (which provides a regulated output voltage that is higher than the input voltage), and buck-boost converters (which provides a regulated output voltage when the input voltage is lower or higher than the regulated output voltage).

FIG. 1 shows a schematic diagram of conventional SMPS DC-DC converter 100 of the buck (step-down) type.

During normal operation, buck controller 102 receives feedback voltage $V_{FB}$ (which is based on output voltage $V_{OUT}$) and reference voltage $V_{REF}$ and causes output transistors 104 and 106 to turn on and off so that feedback voltage $V_{FB}$ is equal to reference voltage $V_{REF}$. Inductor 108 and capacitor no form a low-pass filter (LPF) that reduces the switching noise associated with the turning on and off the output transistors 104 and 106 of output voltage $V_{OUT}$. Buck converter 100 may supply the regulated output voltage $V_{OUT}$ to a load, as shown in FIG. 1.

An LDO regulator (also referred to as an LDO) is a linear voltage regulator that is capable of providing a regulated output voltage that is lower than the input voltage. FIG. 2 shows a schematic diagram of conventional LDO 200. LDO 200 includes error amplifier 202 and output transistor 204.

During normal operation, error amplifier 202 adjusts the gate of output transistor 104 so that regulated output voltage $V_{OUT}$ is equal to reference voltage $V_{REF}$. LDO 200 may supply the regulated output voltage $V_{OUT}$ to a load, as shown in FIG. 2.

SUMMARY

In accordance with an embodiment, a method includes: receiving a main supply voltage; generating a first regulated output voltage with a DC-DC converter; providing the main supply voltage to a driver of a control terminal of an output transistor of an LDO; receiving, at an input terminal of the LDO, the first regulated output voltage; generating, at an output terminal of the LDO, a second regulated output voltage from the first regulated output voltage; and when the main supply voltage falls below a predetermined threshold, discharging a capacitor coupled to the input terminal of the LDO by activating a switch coupled to the input terminal of the LDO.

In accordance with an embodiment, a circuit includes: a DC-DC converter configured to receive a main supply voltage and to generate a first regulated output voltage from the main supply voltage; an LDO having an input configured to receive the first regulated output voltage, where the LDO is configured to generate a second regulated output voltage from the first regulated output voltage at an output of the LDO; a capacitor coupled to the input of the LDO; and a switch coupled to the input of the LDO and configured to discharge the capacitor when the main supply voltage falls below a predetermined threshold.

In accordance with an embodiment, a circuit includes: a main supply terminal configured to receive a main supply voltage; a DC-DC converter having an input coupled to the main supply terminal and an output coupled to an intermediate supply terminal; an LDO having a first input coupled to the intermediate supply terminal, a second input coupled to the main supply terminal, and an output coupled to an output terminal; a capacitor coupled to the intermediate supply terminal; and a switch coupled to the intermediate supply terminal and configured to discharge the capacitor when the main supply voltage falls below a predetermined threshold.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, an overshoot protection scheme for an LDO cascaded with a DC-DC converter, e.g., for supplying a microcontroller. Embodiments of the present invention may be used in other circuits, such as cascaded architectures, as well as for other loads.

In an embodiment of the present invention, an LDO cascaded with a DC-DC converter discharges the input of the LDO when a main supply voltage provided to the DC-DC converter and to the LDO falls below a predetermined threshold. In some embodiments, discharging the input of the LDO when the main supply voltage falls below the predetermined threshold advantageously prevents an overshoot at the output of the LDO, which may prevent damage to a load coupled to the output of the LDO.

Figure 1:
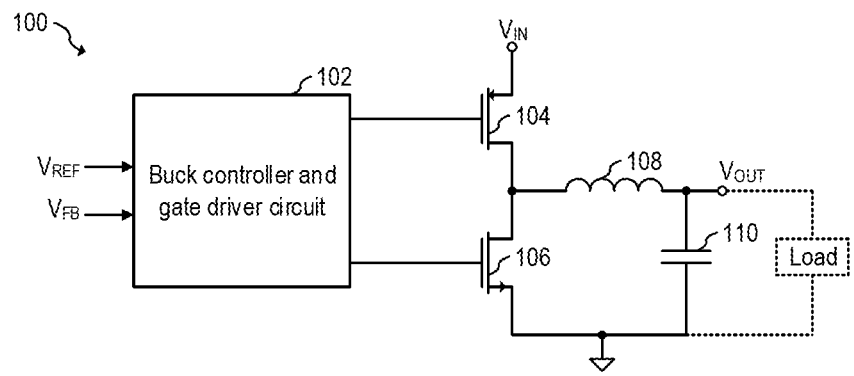
FIG. 1 shows a schematic diagram of a conventional SMPS DC-DC converter of the buck (step-down) type.
Figure 2:
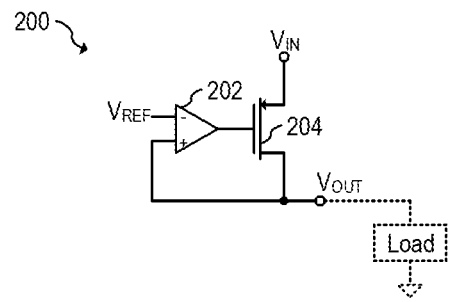
FIG. 2 shows a schematic diagram of a conventional LDO.
Figure 3:
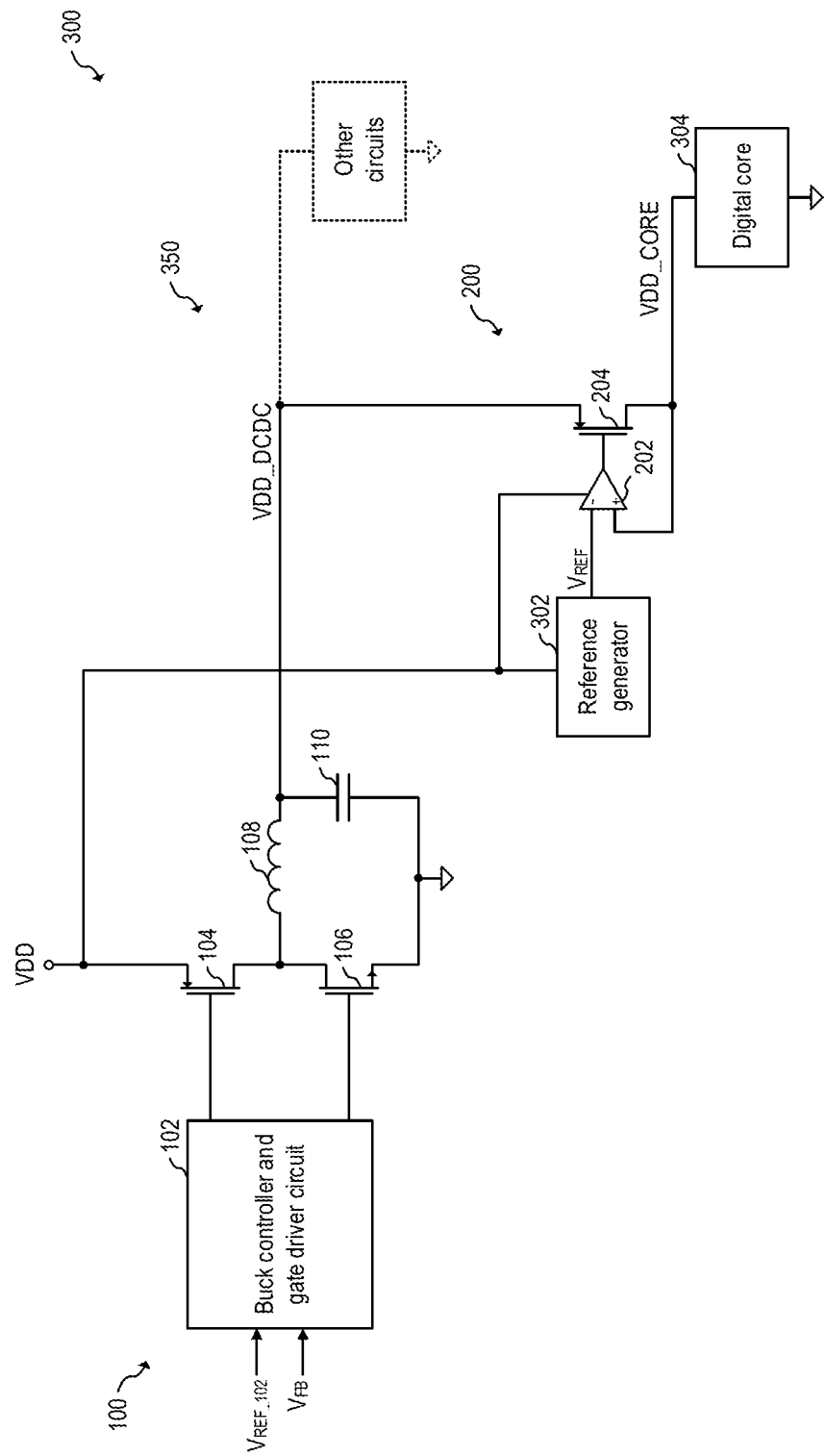
FIG. 3 shows a schematic diagram of a system that includes a cascaded power supply.

In some applications, it may be desirable to have a high power supply rejection ratio (PSRR). Such may be the case, for example, of microcontrollers or digital cores. FIG. 3 shows a schematic diagram of system 300, which includes cascaded power supply 350. Cascaded power supply 350 includes DC-DC converter 100 and LDO 200 in a cascaded architecture for supplying voltage VDD_CORE to digital core 304. A cascaded power supply, such as power supply 350, may exhibit higher PSRR than, e.g., using a single converter.

As shown in FIG. 3, the main supply voltage VDD supplies power to the output stage (transistors 104 and 106) of DC-DC converter 100, as well as to reference generator 302 and error amplifier 202. The output of DC-DC converter 100 (VDD_DCDC) supplies power to the output stage (transistor 204) of LDO 200. The output of LDO 200 (VDD_CORE) supplies power to digital core 304.

In some applications, the output of DC-DC converter 100 (VDD_DCDC) may also supply other circuits, such as radio-frequency (RF) circuits, sensors, etc.

The inventors realized that, in a system such as system 300, when the main supply voltage VDD drops, the output of LDO 200 (VDD_CORE) may not be properly controlled and may instead follow voltage VDD_DCDC, which may cause an overshoot of VDD_CORE. For example, FIG. 4 shows waveforms of voltages VDD, VDD_DCDC, and VDD_CORE of system 300, as main supply voltage VDD falls.

Figure 4:
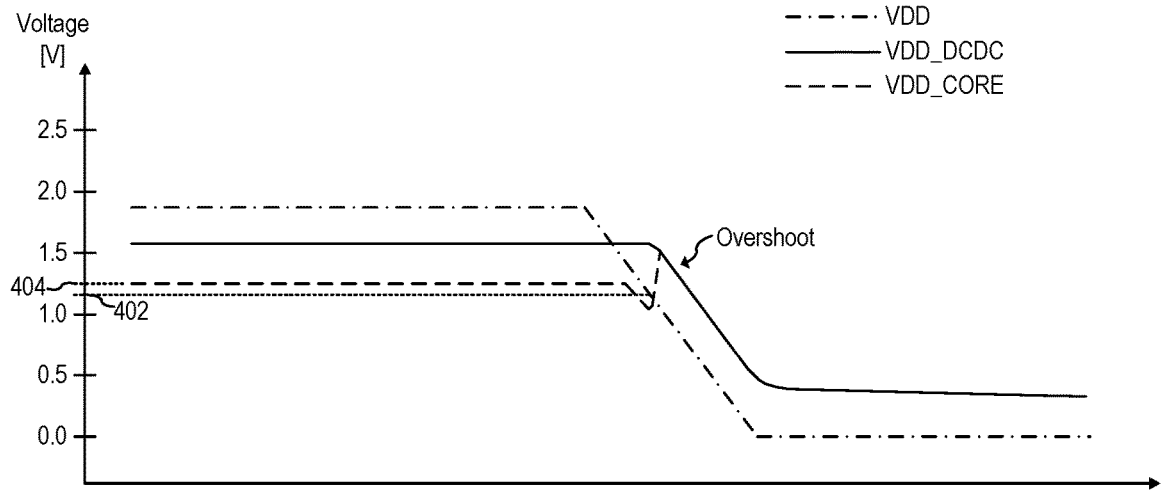
FIG. 4 shows waveforms of voltage rails of the system of FIG. 3.

As shown in FIG. 4, when main supply voltage VDD, which supplies error amplifier 202 (which provides the driver voltage to output transistor 204) drops below a minimum threshold 402, the output voltage VDD_CORE of LDO 200 follows the input voltage VDD_DCDC of LDO 200 (which is the output voltage of buck converter 100). At that point, voltage VDD_CORE may experience an overshoot (above the target regulation voltage 404), which may damage, e.g., digital circuits of digital core 304.

In an embodiment of the present invention, a capacitor coupled to the input of the LDO is discharged when the main supply voltage that supplies the gate driver that drives the output transistor of the LDO falls below a predetermined threshold, where the predetermined threshold is set to be above the minimum threshold in which the gate driver is no longer capable of properly controlling the gate of the output transistor.

Figure 5:
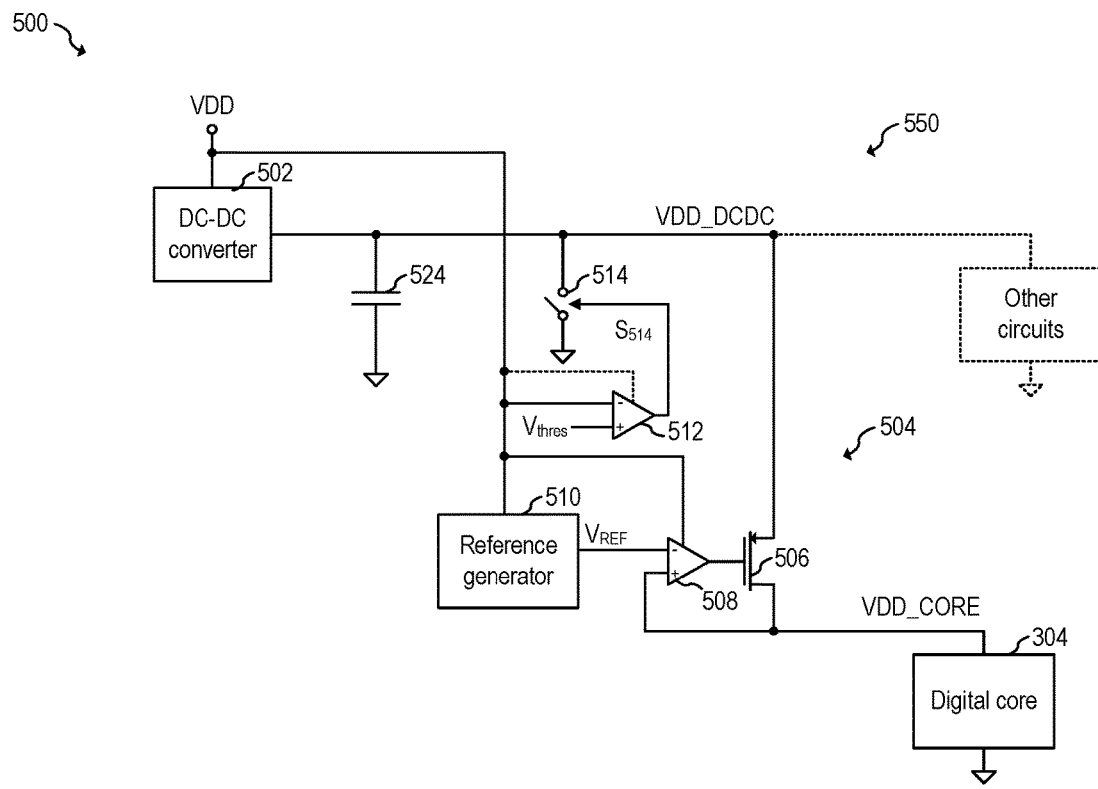
FIG. 5 shows a schematic diagram of a system, according to an embodiment of the present invention.

FIG. 5 shows a schematic diagram of system 500, according to an embodiment of the present invention. System 500 includes cascaded power supply 550. Cascaded power supply 350 includes DC-DC converter 502 and LDO 504 in a cascaded architecture for supplying voltage VDD_CORE to digital core 304.

As shown in FIG. 5, main supply voltage VDD provides power to DC-DC converter 502. DC-DC converter 502 generates voltage VDD_DCDC from main supply voltage, which is the input voltage of LDO 504. Error amplifier 508, which also serves as the gate driver of output transistor 506, is also supplied by main supply voltage VDD.

During normal operation, DC-DC converter 502 receives main supply voltage VDD and generates regulated output voltage VDD_DCDC from main supply voltage VDD. Error amplifier 508 receives reference voltage $V_{REF}$ and adjusts the gate of output transistor 506 so that regulated output voltage VDD_CORE is equal to reference voltage $V_{REF}$.

When main supply voltage VDD falls below a predetermined threshold, comparator 512 asserts its output (i.e., transitions its output to an active state, such as high), and activates switch 514 to discharge capacitor 524.

In some embodiments, the predetermined threshold is set to be equal to the target regulation voltage of the LDO. For example, if the LDO is configured to regulate its output voltage to 1.2 V, then the predetermined threshold may be set to 1.2 V.

Figure 6:
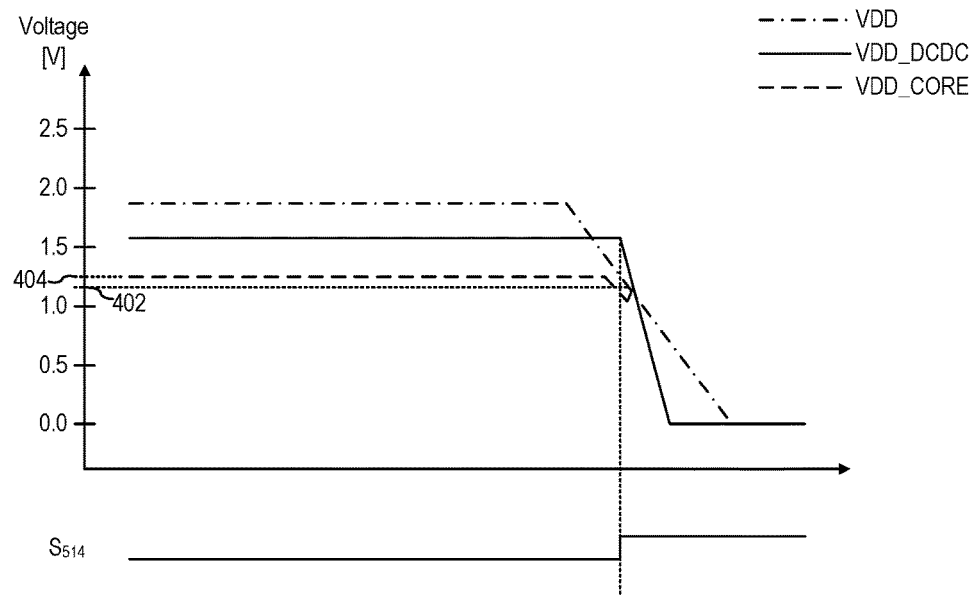
FIG. 6 shows waveforms of voltage rails of the system of FIG. 5, according to an embodiment of the present invention.

FIG. 6 shows waveforms of voltages VDD, VDD_DCDC, and VDD_CORE of system 500, as main supply voltage VDD falls, according to an embodiment of the present invention.

As shown in FIG. 6, at the time signal $S_{514}$ is asserted, voltage VDD_DCDC may be higher than VDD, e.g., because of capacitor 524. Once signal $S_{514}$ is asserted, voltage VDD_DCDC is discharged, which may advantageously reduce or eliminate an overshoot of voltage VDD_CORE when error amplifier 508 is no longer capable of controlling the gate of output transistor 506, e.g., due to the low voltage of main supply voltage VDD.

Some embodiments, as shown in FIG. 6, implement signal $S_{512}$ as an active high signal. Other embodiments may implement signal $S_{512}$ as an active low signal.

In some embodiments, DC-DC converter 502 may be implemented, e.g., as a buck converter, such as buck converter 102. In other embodiments, DC-DC converter may be implemented with other SMPS topologies, such as boost or buck-boost. In yet other embodiments, DC-DC converter may be a non-switching converter, such as an LDO.

In some embodiments, DC-DC converter may include more than one stage. For example, in some embodiments, DC-DC converter may include a first boost converter that provides power to a second buck converter stage, where the second buck converter stage is the converter that generates voltage VDD_DCDC. Other implementations are also possible.

In some embodiments, capacitor 524 may be considered part of DC-DC converter 502. In some embodiments, capacitor 524 may be considered part of LDO 504.

Digital core 304 may be, for example, a general purpose or custom microcontroller, or processor, such as a digital signal processor (DSP), or a custom application-specific integrated circuit (ASIC) or a custom digital circuit. In some embodiments, digital core 304 may be part of a general purpose or custom microcontroller, processor, or ASIC, or a portion of an integrated circuit (IC), such as a digital portion of a power management IC (PMIC).

In some embodiments, voltage VDD_DCDC may provide power to other circuits, such as RF circuits, sensors, etc. In other embodiments, voltage VDD_DCDC may only provide power to LDO 504.

Reference generator 510 may be implemented in any way known in the art. For example, in some embodiments, reference generator may be a bandgap circuit. In some embodiments, reference generator 510 may be part of LDO 504. In other embodiments, reference generator 510 may be external to LDO 504.

In some embodiments, reference generator 510, error amplifier 508, output transistor 506, comparator 512, and switch 514 are integrated in an IC having a monolithic semiconductor substrate. In some embodiments, such IC also includes digital core 304, and/or at least a portion of DC-DC converter 502 and/or other circuits. In some embodiments, system 550 may be implemented solely with discrete components. Other implementations with different levels of integration are also possible.

In some embodiments, voltage VDD comes from, e.g., a battery, such as a lithium-ion battery. In other embodiments, voltage VDD may come from another circuit, such as an AC-DC converter or another DC-DC converter.

In some embodiments, such as shown in FIG. 5, the current path of output transistor 506 is directly connected to an input of error amplifier 508. In some embodiments, a circuit (not show), such as a resistive feedback network, is coupled between the input of error amplifier 508 and the current path of output transistor 506.

In some embodiments, a separate gate driver (not shown) is coupled between the output of error amplifier 508 and the gate of output transistor 506. In such embodiments, such gate driver may be powered by voltage VDD.

Switch 514 may be implemented in any way known in the art. For example, in some embodiments, switch 514 may be implemented with a transistor of the n-type, such as an n-type metal-oxide semiconductor (NMOS) transistor. Switch 514 may be sized, e.g., according to maximum supply decreasing slope and the capacitance of capacitor 5. For example, in some embodiments, switch 512 is sized so that capacitor 524 is discharged before comparator 512 losses its power.

Comparator 512 may be implemented in any way known in the art. In some embodiments, comparator 512 may be powered by VDD.

Figure 7:
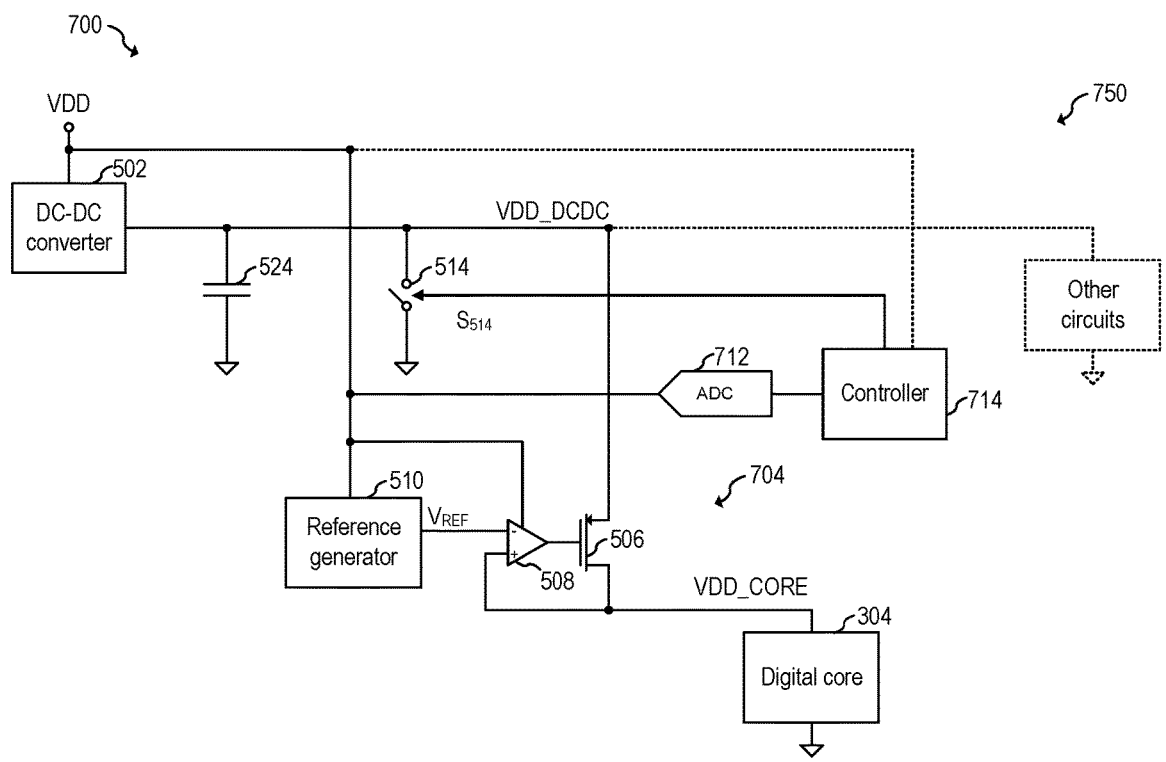
FIG. 7 shows a schematic diagram of a system, according to an embodiment of the present invention.

Some embodiments may achieve the discharge of capacitor 524 when main supply voltage VDD falls below the predetermined threshold in other ways. For example, FIG. 7 shows a schematic diagram of system 700, according to an embodiment of the present invention. System 700 operates in a similar manner as system 50o and may produce waveforms similar to the waveforms of FIG. 6. System 700 however, uses analog-to-digital converter (ADC) 712 to sense main supply voltage VDD, and controller 714 asserts signal $S_{514}$ when the digital code generated by ADC 712 is below a predetermined code that corresponds to the predetermined threshold $V_{thres}$.

ADC 712 may be implemented in any way known in the art. For example, in some embodiments, ADC 712 may be implemented as a successive approximation register (SAR) ADC. Other implementations are also possible.

Controller 714 may be implemented as a general purpose or custom microcontroller. For example, in some embodiments, digital core 304 may implement controller 714. In some embodiments, controller 714 may include ADC 712. In some embodiments, controller 714 may be powered by VDD.

Example embodiments of the present invention are summarized here. Other embodiments can also be understood from the entirety of the specification and the claims filed herein.

Example 1. A method including: receiving a main supply voltage; generating a first regulated output voltage with a DC-DC converter; providing the main supply voltage to a driver of a control terminal of an output transistor of an LDO; receiving, at an input terminal of the LDO, the first regulated output voltage; generating, at an output terminal of the LDO, a second regulated output voltage from the first regulated output voltage; and when the main supply voltage falls below a predetermined threshold, discharging a capacitor coupled to the input terminal of the LDO by activating a switch coupled to the input terminal of the LDO.

Example 2. The method of example 1, where receiving, at the input terminal of the LDO, the first regulated output voltage, includes receiving the first regulated output voltage at a first current path terminal of the output transistor, and where generating, at the output terminal of the LDO, the second regulated output voltage includes generating the second regulated output voltage at a second current path terminal of the output transistor.

Example 3. The method of one of examples 1 or 2, where the output transistor is a transistor of the p-type.

Example 4. The method of one of examples 1 to 3, where the predetermined threshold is equal to a target regulation voltage of the LDO.

Example 5. The method of one of examples 1 to 4, where the DC-DC converter includes a buck converter.

Example 6. The method of one of examples 1 to 5, where the driver is an error amplifier.

Example 7. A circuit including: a DC-DC converter configured to receive a main supply voltage and to generate a first regulated output voltage from the main supply voltage; an LDO having an input configured to receive the first regulated output voltage, where the LDO is configured to generate a second regulated output voltage from the first regulated output voltage at an output of the LDO; a capacitor coupled to the input of the LDO; and a switch coupled to the input of the LDO and configured to discharge the capacitor when the main supply voltage falls below a predetermined threshold.

Example 8. The circuit of example 7, where the LDO includes; an output transistor having a current path configured to receive the first regulated output voltage; and an error amplifier having an output coupled to a control terminal of the output transistor, a first input configured to receive a reference voltage, a second input coupled to the current path of the output transistor, and a supply terminal configured to receive the main supply voltage.

Example 9. The circuit of one of examples 7 or 8, further including a digital core coupled to the current path of the output transistor.

Example 10. The circuit of one of examples 7 to 9, where the output transistor is a transistor of the p-type.

Example 11. The circuit of one of examples 7 to 10, further including a comparator having an input configured to receive the main supply voltage, and an output coupled to a control terminal of the switch.

Example 12. The circuit of one of examples 7 to 11, further including an analog-to-digital converter (ADC) having an input configured to receive the main supply voltage, where the switch is configured to discharge the capacitor based on an output of the ADC.

Example 13. The circuit of one of examples 7 to 12, where the predetermined threshold is equal to a target regulation voltage of the LDO.

Example 14. The circuit of one of examples 7 to 13, where the DC-DC converter includes a buck converter of the switched-mode power supply (SMPS) type.

Example 15. The circuit of one of examples 7 to 14, further including a load configured to receive the first regulated output voltage.

Example 16. The circuit of one of examples 7 to 15, where the DC-DC converter includes the capacitor.

Example 17. A circuit including: a main supply terminal configured to receive a main supply voltage; a DC-DC converter having an input coupled to the main supply terminal and an output coupled to an intermediate supply terminal; an LDO having a first input coupled to the intermediate supply terminal, a second input coupled to the main supply terminal, and an output coupled to an output terminal; a capacitor coupled to the intermediate supply terminal; and a switch coupled to the intermediate supply terminal and configured to discharge the capacitor when the main supply voltage falls below a predetermined threshold.

Example 18. The circuit of example 17, where the LDO includes: an output transistor having a current path coupled between the intermediate supply terminal and the output terminal; and an error amplifier having an output coupled to a control terminal of the output transistor, a supply terminal coupled to the second input of the LDO, and an input coupled to the current path of the output transistor.

Example 19. The circuit of one of examples 17 or 18, further including a comparator having an input coupled to the main supply terminal, and an output coupled to a control terminal of the switch.

Example 20. The circuit of one of examples 17 to 19, where the comparator includes a second input configured to receive the predetermined threshold, where the predetermined threshold is based on a target regulation voltage of the LDO.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
receiving a main supply voltage;
generating a first regulated output voltage with a DC-DC converter;
providing the main supply voltage to a supply terminal of a driver, the driver having an output coupled to a control terminal of an output transistor of an LDO, the main supply voltage used to power the driver, the LDO having an input terminal coupled to a first current path terminal of the output transistor, and an output terminal coupled to second current path terminal of the output transistor;
receiving, at the input terminal of the LDO, the first regulated output voltage;
generating, at the output terminal of the LDO, a second regulated output voltage from the first regulated output voltage; and
in response to the main supply voltage falling below a predetermined threshold, discharging a capacitor coupled to the input terminal of the LDO by activating a switch coupled to the input terminal of the LDO.

2. The method of claim 1, wherein the output transistor is a transistor of the p-type.

3. The method of claim 1, wherein the predetermined threshold is substantially equal to a target regulation voltage of the LDO.

4. The method of claim 1, wherein the DC-DC converter comprises a buck converter.

5. The method of claim 1, wherein the driver is an error amplifier.

6. The method of claim 1, wherein the predetermined threshold is lower than a target regulation voltage of the LDO.

7. The method of claim 1, wherein the first regulated output voltage is lower than the main supply voltage, and wherein the second regulated output voltage is lower than the first regulated output voltage.

8. A circuit comprising:
a DC-DC converter configured to receive a main supply voltage and to generate a first regulated output voltage from the main supply voltage;
an LDO comprising:
an input configured to receive the first regulated output voltage,
an output transistor having a current path coupled between the input of the LDO and an output of the LDO, and
an error amplifier having an output coupled to a control terminal of the output transistor, a first input configured to receive a reference voltage, a second input coupled to the output of the LDO and a supply terminal configured to receive the main supply voltage to power the error amplifier, wherein the LDO is configured to generate a second regulated output voltage from the first regulated output voltage at the output of the LDO;
a capacitor coupled to the input of the LDO; and
a switch coupled to the input of the LDO and configured to discharge the capacitor in response to the main supply voltage below a predetermined threshold.

9. The circuit of claim 8, further comprising a digital core coupled to the current path of the output transistor.

10. The circuit of claim 8, wherein the output transistor is a transistor of the p-type.

11. The circuit of claim 8, further comprising a comparator having an input configured to receive the main supply voltage, and an output coupled to a control terminal of the switch.

12. The circuit of claim 8, further comprising an analog-to-digital converter (ADC) having an input configured to receive the main supply voltage, wherein the switch is configured to discharge the capacitor based on an output of the ADC.

13. The circuit of claim 8, wherein the predetermined threshold is substantially equal to a target regulation voltage of the LDO.

14. The circuit of claim 8, wherein the DC-DC converter comprises a buck converter of the switched-mode power supply (SMPS) type.

15. The circuit of claim 8, further comprising a load configured to receive the first regulated output voltage.

16. The circuit of claim 8, wherein the DC-DC converter comprises the capacitor.

17. A circuit comprising:
a main supply terminal configured to receive a main supply voltage;
a DC-DC converter having an input coupled to the main supply terminal and an output coupled to an intermediate supply terminal;

an LDO comprising:
- an output transistor having a current path coupled between the intermediate supply terminal and an output terminal of the LDO, and
- an error amplifier having an output coupled to a control terminal of the output transistor, a supply terminal coupled to the main supply terminal and configured to receive the main supply voltage for powering the error amplifier, a first input coupled to the output terminal of the LDO, and a second input;

a capacitor coupled to the intermediate supply terminal; and a switch coupled to the intermediate supply terminal and configured to discharge the capacitor in response to the main supply voltage falling below a predetermined threshold.

18. The circuit of claim 17, further comprising a comparator having an input coupled to the main supply terminal, and an output coupled to a control terminal of the switch.

19. The circuit of claim 18, wherein the comparator comprises a second input configured to receive the predetermined threshold, wherein the predetermined threshold is based on a target regulation voltage of the LDO.

20. The circuit of claim 17, wherein the first input of the error amplifier is directly connected to the current path of the output transistor.

* * * * *